United States Patent
Jalbert

[15] 3,673,870
[45] July 4, 1972

[54] TEMP-A-CHECK

[72] Inventor: Armand F. Jalbert, 6313 57th Avenue North, Saint Petersburg, Fla. 33709

[22] Filed: Oct. 7, 1970

[21] Appl. No.: 78,893

[52] U.S. Cl. ............................................................. 73/349
[51] Int. Cl. ......................................................... G01k 1/16
[58] Field of Search ........................................ 73/349, 338.6

[56] References Cited

UNITED STATES PATENTS

| 2,688,252 | 9/1954 | King | 73/338.6 |
| 2,839,924 | 6/1958 | Pauli | 73/349 |
| 2,894,391 | 7/1959 | Colt | 73/338.6 |

Primary Examiner—Louis R. Prince
Assistant Examiner—Denis E. Corr

[57] ABSTRACT

A forced air thermometer for enabling temperatures to be taken accurately and quickly, the device comprising a case containing a motor driven impeller, the motor being in series electrical circuit with a dry cell battery contained within the case and an externally mounted electric switch, the case being provided with a plurality of air openings around the sides thereof in alignment with the impeller, and a thermometer being positioned at one end of the case directly in front of the impeller.

4 Claims, 2 Drawing Figures

PATENTED JUL 4 1972 3,673,870

*INVENTOR*
Armand F. Jalbert

TEMP-A-CHECK

This invention relates generally to temperature measuring apparatus.

A principal object of the present invention is to provide a forced air thermometer for enabling temperatures to be taken accurately within 5 to 10 seconds.

Another object of the present invention is to provide a temp-a-chek which accordingly permits heating and air conditioning technicians and engineers to check temperature variations in different areas of a room or in a multiple room installation.

Other objects of the present invention are to provide a temp-a-check which is simple in design, inexpensive to manufacture, rugged in construction, easy to use and efficient in operation.

Figure 1:
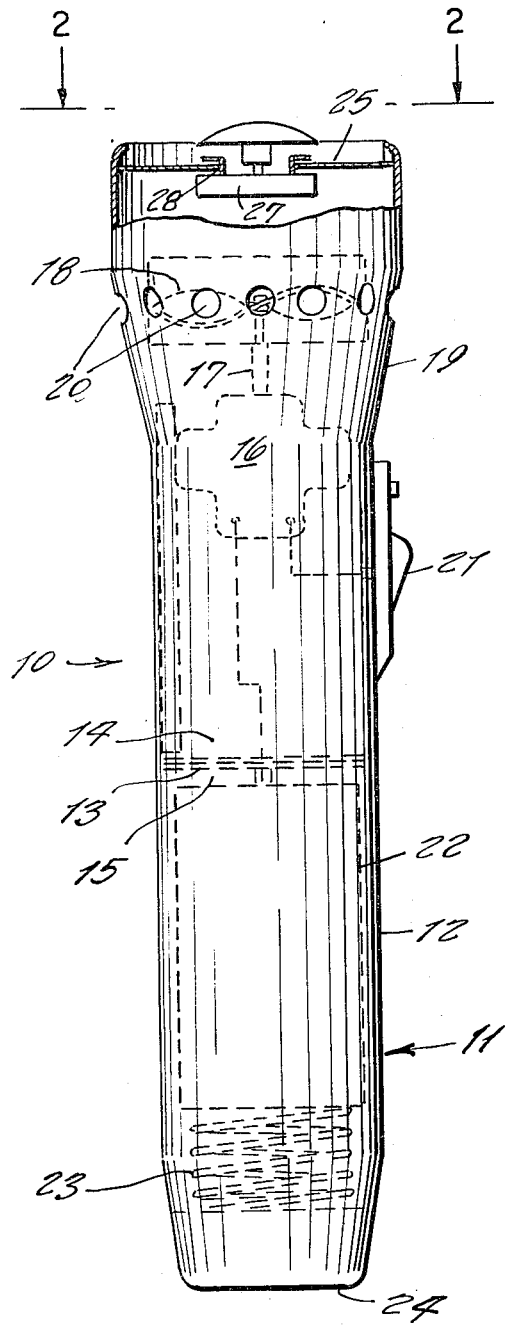
Figure 2:
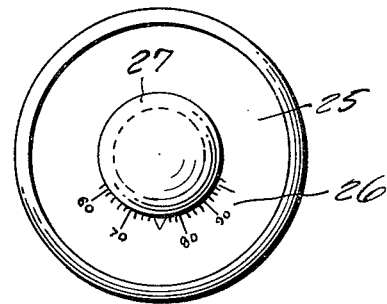

These and other objects will be readily evident upon a study of the following specification and the accompanying drawing wherein:

FIG. 1 is a side elevational view of the present invention and shown partly in cross-section so as to show an open-face thermometer, and FIG. 2 is an end elevation view as viewed in the direction of 2—2 of FIG. 1.

Referring now to the drawing in detail, the reference numeral 10 represents a temp-a-chek according to the present invention wherein there is a generally flashlight-like configurated assembly 11 and which includes an elongated, cylindrically configurated case 12.

The interior of the case may be divided by a transverse partition 13 into two compartments 14 and 15, the compartment 14 containing an electric motor 16 having a motor shaft 17 upon the end of which there is mounted an impeller 18.

The cylindrical side wall 19 of the case case us provided with a plurality of openings 20 extending there through and located in alignment with the impeller 18 so to provide air to the impeller.

A manually operated electric switch 21 is externally mounted upon the side of the case 12, the switch 21 being in electrical series circuit with the motor 16 and with a dry cell battery 22 which is located within the compartment 15.

The dry cell battery 22 is springingly maintained in contact position with the circuit by means of a compression coil spring 23 at the rear thereof, the opposite end of the compression coil spring bearing against a removable end cap 24 on the end of the case and which is provided for normally replacing the dry cell battery after it has become worn out from use.

Upon a forward end 25 of the case there is provided a dial 25 provided with graduations 26 denoting temperature degrees. An open face thermometer 27 is fitted in the opening 28 of the dial 25, the open face thermometer accordingly being directly in line for receiving air from the impeller 18.

The open face thermometer mounted directly in front of the small fan or impeller thus draws the air through the coil of the thermometer.

The fan is driven by the small motor which is of 1.5 volt power.

Thus there is provided a forced air thermometer which enables to be taken accurately within 5 to 10 seconds so to permit technicians and engineers to check temperature variations quickly in different areas of a singular room or within a multiple room installation of air condition or heating apparatus.

What I now claim is:

1. In a thermometer temp-a-check, the combination of an elongated case of portable type, said case being provided with a removable end cap at one end thereof, said case including a cylindrical side wall around a central area, said central area being divided by means of a transverse partition into two separate compartments, one of said compartments containing power means and the other of said compartments containing means for taking temperatures accurately and in a quick manner, wherein said compartment for taking temperatures accurately and quickly comprises an electric motor having a motor shaft, said motor shaft having an impeller mounted upon the end thereof, said cylindrical side wall of said case being provided with a plurality of openings in radial alignment with and juxtaposed to said impeller so to provide air for said impeller, and said case being provided at one end with a thermometer dial having a central opening within which is fitted a forced air thermometer located directly in front of said impeller for being activated by said impeller, said air forced thermometer accordingly including a coil, and said dial being graduated into degree graduations.

2. The combination as set forth in claim 1, wherein the other of said compartments is provided with a dry cell battery fitted there within, one end of said dry cell battery having one end of a compression coil spring bearing there against, the opposite end of said compression coil spring bearing against said end cap for normally urging said dry cell battery into contact position in an electrical circuit.

3. The combination as set forth in claim 2, wherein said electrical circuit comprises said motor, said dry cell battery and an externally mounted switch for manual operation.

4. The combination as set forth in claim 3, wherein said end cap is readily removable for purpose of replacement of said dry cell battery after becoming worn out.

* * * * *